(12) United States Patent
Kim et al.

(10) Patent No.: US 10,664,103 B2
(45) Date of Patent: May 26, 2020

(54) CURVED DISPLAY APPARATUS PROVIDING AIR TOUCH INPUT FUNCTION

(71) Applicant: TOVIS CO., Ltd., Incheon (KR)

(72) Inventors: Yong Beom Kim, Incheon (KR); Joon Seog Kim, Gyeonggi-do (KR)

(73) Assignee: TOVIS CO., Ltd., Incheon (KR)

( * ) Notice: Subject to any disclaimer, the term of this patent is extended or adjusted under 35 U.S.C. 154(b) by 0 days.

(21) Appl. No.: 14/917,022

(22) PCT Filed: Nov. 10, 2014

(86) PCT No.: PCT/KR2014/010726
§ 371 (c)(1),
(2) Date: Mar. 7, 2016

(87) PCT Pub. No.: WO2016/052801
PCT Pub. Date: Apr. 7, 2016

(65) Prior Publication Data
US 2016/0291715 A1 Oct. 6, 2016

(30) Foreign Application Priority Data
Sep. 29, 2014 (KR) .................. 10-2014-0130566

(51) Int. Cl.
*G06F 3/042* (2006.01)
*H04N 13/305* (2018.01)
(Continued)

(52) U.S. Cl.
CPC .............. *G06F 3/042* (2013.01); *G06F 3/011* (2013.01); *G06F 3/016* (2013.01); *G06F 3/017* (2013.01);
(Continued)

(58) Field of Classification Search
CPC ...... G06F 3/041; G06F 3/0412; G06F 3/0416; G06F 3/0425; G06F 3/044; G06F 3/045;
(Continued)

(56) References Cited

U.S. PATENT DOCUMENTS 8,294,987 B1 * 10/2012 van Nuland ....... G02B 27/2214
359/446
8,890,809 B2   11/2014 Izumi
(Continued)

FOREIGN PATENT DOCUMENTS

| JP | 2011-039844 A | 2/2011 |
| JP | 2013-058084 A | 3/2013 |

(Continued)

OTHER PUBLICATIONS

International Search Report for PCT/KR2014/010726 dated Jun. 22, 2015 from Korean Intellectual Property Office.

*Primary Examiner* — Alexander Eisen
*Assistant Examiner* — Nelson Lam
(74) *Attorney, Agent, or Firm* — Revolution IP, PLLC

(57) ABSTRACT

A curved display apparatus providing an air touch input function including: a curved display including a concavely curved monitor to display a three-dimensional image; a three-dimensional filter unit having the same radius of curvature as the curved monitor and disposed in front of the curved monitor; a position input unit disposed in front of the three-dimensional filter unit and configured to detect a three-dimensional position according to a user's non-touch motion in a predetermined sensing region; and an image control unit configured to control a three-dimensional image displayed on the curved monitor by transmitting position information sensed through position input unit to the curved (Continued)

display, wherein air touch input through a user's non-touch motion is performed in a concave region of the curved display.

4 Claims, 3 Drawing Sheets

(51) Int. Cl.
*G06F 3/041* (2006.01)
*G06F 3/01* (2006.01)
*G06F 3/0484* (2013.01)
*G02F 1/00* (2006.01)

(52) U.S. Cl.
CPC ........ *G06F 3/0412* (2013.01); *G06F 3/04845* (2013.01); *H04N 13/305* (2018.05); *G02F 1/00* (2013.01); *G06F 2203/04108* (2013.01); *G06F 2203/04806* (2013.01)

(58) Field of Classification Search
CPC ........... G06F 3/046; G06F 2203/04108; G06F 2203/04802; G06F 3/016; G06F 3/017; G06F 3/0421
USPC .................................................. 345/173–179
See application file for complete search history.

(56) References Cited

U.S. PATENT DOCUMENTS

| | | | |
|---|---|---|---|
| 8,982,545 B2* | 3/2015 | Kim | B32B 17/064 361/679.21 |
| 9,523,875 B2* | 12/2016 | Kim | G02F 1/1333 |
| 9,784,998 B2* | 10/2017 | Kim | G02F 1/133305 |
| 10,591,814 B2* | 3/2020 | Kim | G03B 21/26 |
| 2005/0083314 A1* | 4/2005 | Shalit | G06F 1/1626 345/179 |
| 2005/0180006 A1* | 8/2005 | Mendoza | G02B 27/2214 359/463 |
| 2006/0291051 A1 | 12/2006 | Kim et al. | |
| 2007/0288194 A1* | 12/2007 | Boillot | G06F 3/0304 702/150 |
| 2010/0020026 A1* | 1/2010 | Benko | G06F 3/041 345/173 |
| 2010/0023895 A1* | 1/2010 | Benko | G06F 3/041 715/863 |
| 2010/0149182 A1* | 6/2010 | Butler | G06F 3/011 345/424 |
| 2010/0302015 A1* | 12/2010 | Kipman | G06F 3/011 340/407.1 |
| 2011/0169832 A1* | 7/2011 | Brown | G06F 3/0304 345/427 |
| 2011/0193939 A1* | 8/2011 | Vassigh | G06F 3/011 348/46 |
| 2011/0205151 A1* | 8/2011 | Newton | G06F 3/011 345/156 |
| 2012/0001875 A1* | 1/2012 | Li | G01S 7/5273 345/177 |
| 2012/0223909 A1* | 9/2012 | Tse | G06F 3/0304 345/174 |
| 2014/0098040 A1* | 4/2014 | Kwon | G06F 3/01 345/173 |
| 2014/0133022 A1 | 5/2014 | Kim et al. | |
| 2015/0185949 A1* | 7/2015 | Oh | G06F 3/0488 345/173 |
| 2015/0220171 A1* | 8/2015 | Cho | G06F 3/041 345/173 |
| 2015/0277610 A1* | 10/2015 | Kim | G06F 3/016 345/173 |
| 2016/0147375 A1* | 5/2016 | Bok | G06F 3/0421 345/175 |
| 2017/0345218 A1* | 11/2017 | Bedikian | G06F 3/04883 |

FOREIGN PATENT DOCUMENTS

| KR | 10-0656575 B1 | 12/2006 |
|---|---|---|
| KR | 10-2012-0079890 A | 7/2012 |
| KR | 10-1350310 B1 | 5/2014 |

* cited by examiner

[Fig. 1]
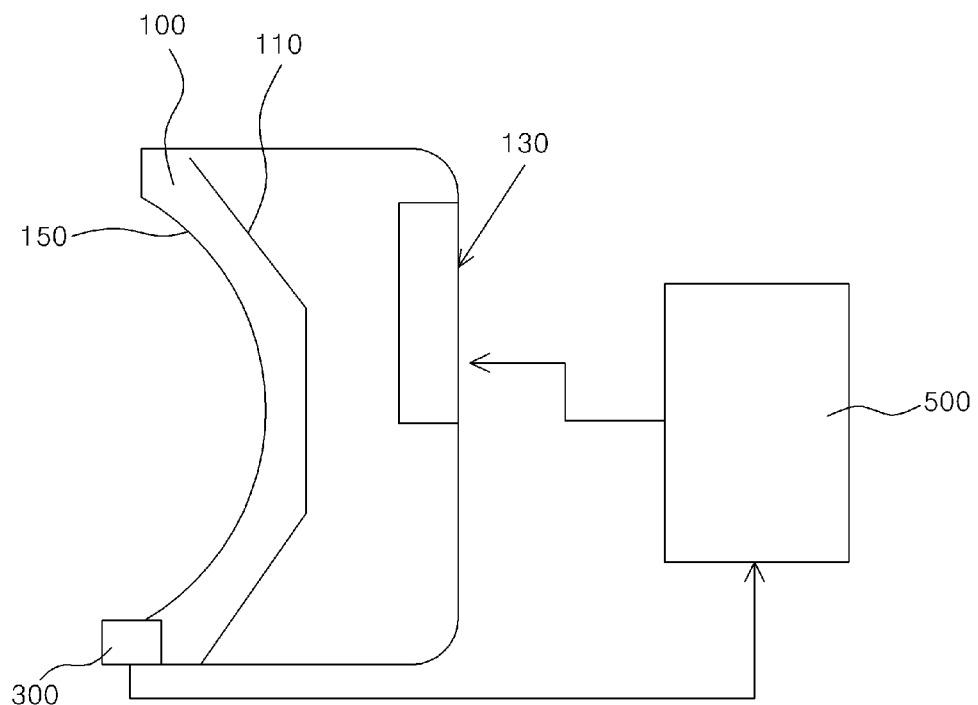
[Fig. 2]
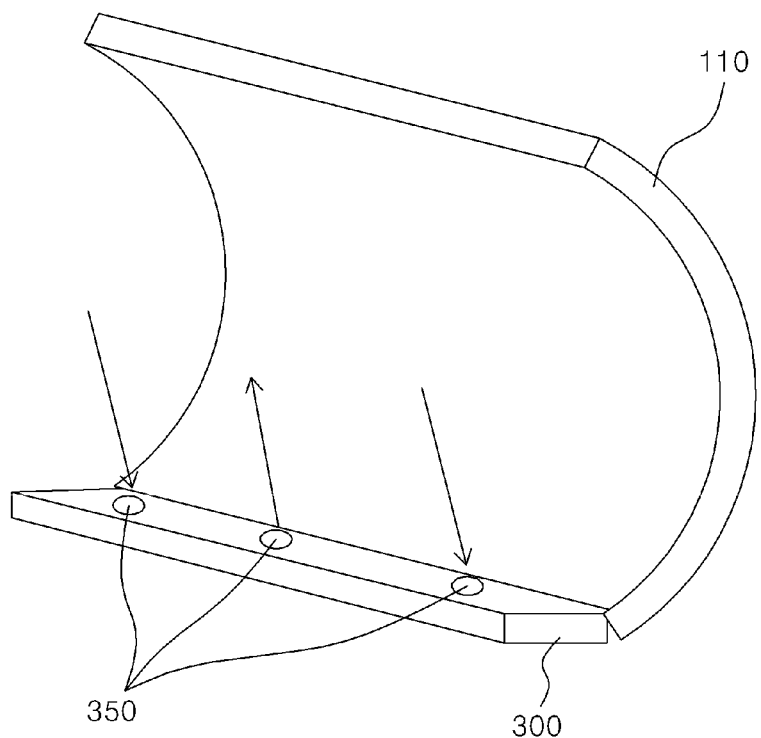

【Fig. 3】
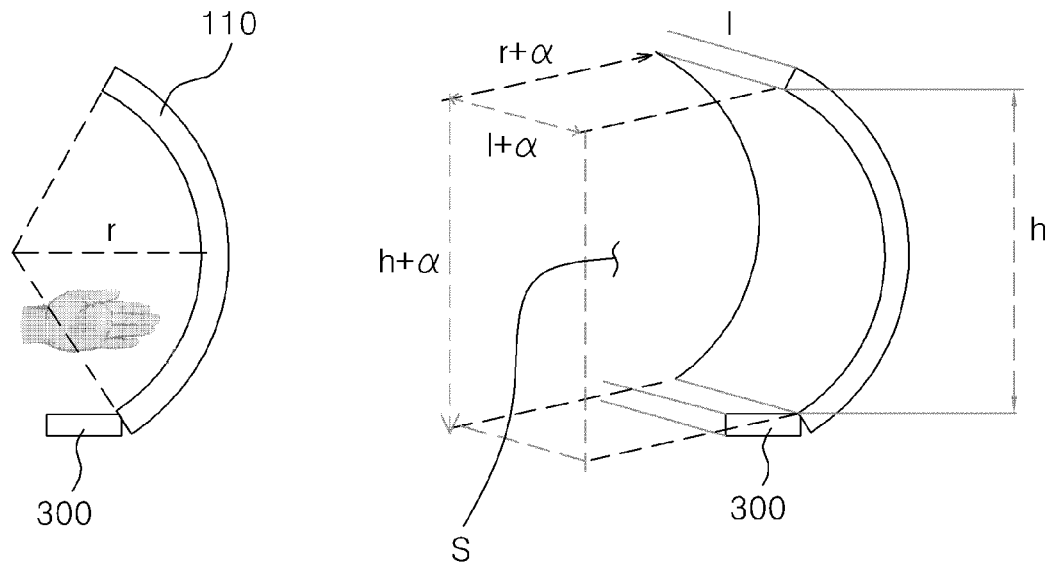
【Fig. 4】
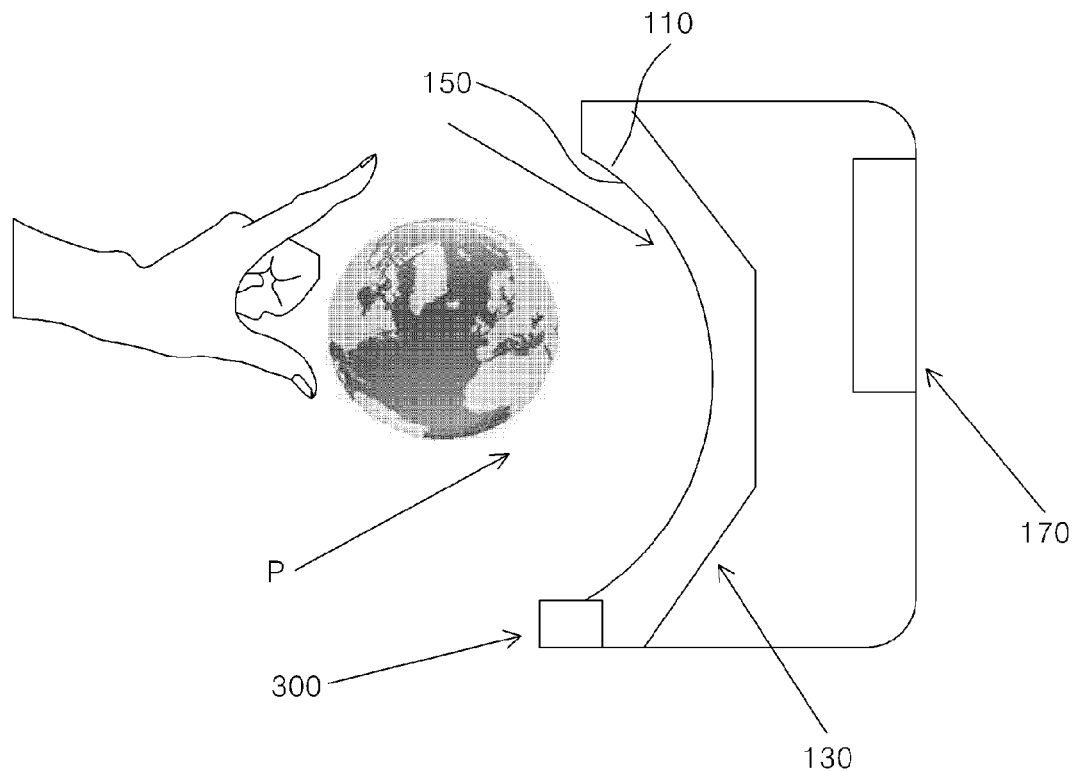

【Fig. 5】
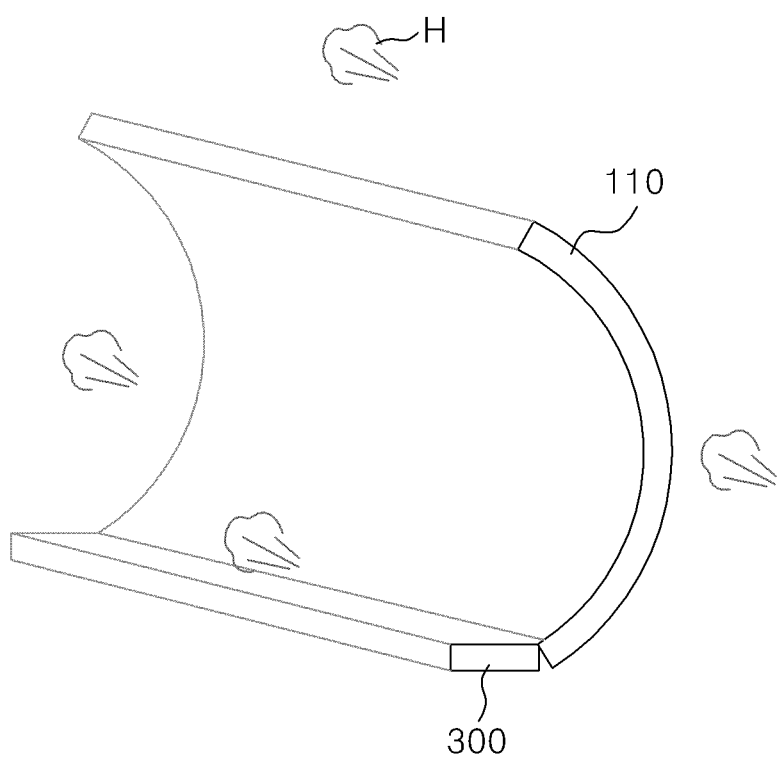

CURVED DISPLAY APPARATUS PROVIDING AIR TOUCH INPUT FUNCTION

CROSS REFERENCE TO PRIOR APPLICATIONS

This application is a National Stage Application of PCT International Patent Application No. PCT/KR2014/010726 filed on Nov. 10, 2014, under 35 U.S.C. § 371, which claims priority to Korean Patent Application No. 10-2014-0130566 filed on Sept. 29, 2014, which are all hereby incorporated by reference in their entirety.

TECHNICAL FIELD

The present invention relates to a curved display apparatus providing an air touch input function and, more particularly, to a curved display apparatus including a spatial position input unit provided at a portion of a curved display, thereby enabling a user to carry out control input by air touch.

BACKGROUND ART

Recently, touchscreens have been widely used in place of keyboards, and are configured to enable input to be directly made on a screen so that when a user's finger or an object touches a character or a specific location on the screen, the location of the touch is sensed and then specific processing corresponding to the sensed location of the touch is performed using installed software.

Such touchscreens can display characters or picture information corresponding to functions in various manners, thus allowing users to easily perceive the functions.

For this reason, touchscreens have been applied to and variously used for devices for guidance, point-of-sale (POS) terminals for stores, devices for typical business purposes, etc. in various places such as subway stations, department stores, and banks.

A conventional touchscreen apparatus is formed by attaching a touch panel to the screen of a monitor, and operates such that when a fingertip or an object touches a predetermined region, user input is sensed by sensing the variation in the characteristics of the predetermined region.

In other words, the entire conventional touchscreen is divided into two-dimensional grids and analyzes the location of a touch.

The touchscreen is based on an interface scheme in which touches are sensed using capacitance, ultrasonic waves, infrared rays, a resistive film, sound wave recognition, or the like.

That is, since the conventional touchscreen is configured in a two-dimensional form in which a display screen and a touch panel are arranged on the same plane, there is a limitation in providing various user interfaces.

PRIOR ART PATENT LITERATURE (Patent Literature 1) Korean Patent Laid-Open Publication No. 10-2012-0079890

DISCLOSURE

Technical Problem

The present invention has been devised to solve the above problems, and it is an object of the present invention to provide a curved display apparatus providing an air touch input function, which includes a spatial position input unit provided at a portion of a curved display so as to enable a user to carry out control input by air touch and can maximize a user's feeling of space by enabling a user to stretch his or her hand into a concave space and perform air touch with a realistic three-dimensional image displayed through a three-dimensional filter unit and a curved monitor.

Technical Solution

In accordance with an aspect of the present invention, the above and other objects can be accomplished by the provision of a curved display apparatus providing an air touch input function comprising: a curved display including a concavely curved monitor to display a three-dimensional image; a three-dimensional filter unit having the same radius of curvature as the curved monitor and disposed in front of the curved monitor; a position input unit disposed in front of the three-dimensional filter unit and configured to detect a three-dimensional position according to a user's non-touch motion in a predetermined sensing region; and an image control unit configured to control a three-dimensional image displayed on the curved monitor by transmitting position information sensed through position input unit to the curved display, wherein air touch input through a user's non-touch motion is performed in a concave region of the curved display.

The position input unit may include an infrared sensor or an ultrasonic sensor configured to output a sensing signal upward from below or downward from above.

The sensing region may include a range extending forward from a concave surface of the curved monitor by a predetermined radius of curvature, a range extending in a longitudinal direction of the curved monitor, and a range extending in a height direction of the curved monitor.

The curved display may further include an interaction unit configured to be synchronized with the position information sensed through the position input unit and perform physical interaction.

The interaction unit may include a polymer-based haptic element or piezo element.

The three-dimensional filter unit may include a lenticular lens sheet.

Advantageous Effects

The curved display apparatus providing an air touch input function of the present invention enables a user to carry out control input by air touch through a spatial position input unit provided at a portion of a curved display, and can maximize a user's feeling of space by enabling a user to stretch his or her hand into the concave space and perform air touch with a realistic three-dimensional image displayed through the three-dimensional filter unit and the curved monitor.

DESCRIPTION OF DRAWINGS

FIG. 1 is a view illustrating a curved display apparatus providing an air touch input function according to an embodiment of the present invention;

FIG. 2 is a view illustrating a position input unit of the curved display apparatus providing an air touch input function according to an embodiment of the present invention;

FIG. 3 is a view illustrating a sensing region of the curved display apparatus providing an air touch input function according to an embodiment of the present invention;

FIG. 4 is a view for explaining an exemplary operation of the curved display apparatus providing an air touch input function according to an embodiment of the present invention; and FIG. 5 is a view for explaining haptic effects of the curved display apparatus providing an air touch input function according to an embodiment of the present invention.

[Description of Reference Numerals]

| | |
|---|---|
| 100: Curved display | 110: Curved monitor |
| 130: Backlight unit | 150: Three-dimensional filter unit |
| 170: Display driving unit | 300: Position input unit |
| 500: Image control unit | S: Sensing region |

BEST MODE

Now, preferred embodiments of the present invention will be described in detail with reference to the annexed drawings so as to allow those skilled in the art to easily understand and realize the present invention through the preferred embodiments.

A curved display apparatus providing an air touch input function according to an embodiment of the present invention, as shown in FIG. 1, comprises a curved display 100, a position input unit 300, and an image control unit 500.

The curved display 100 serves to provide two-dimensional and three-dimensional images, and has a touch interface. The curved display 100 includes a curved monitor 110, a backlight unit 130, a three-dimensional filter unit 150, and a display driving unit 170 for driving the curved monitor 110.

The curved monitor 110 is disposed at a front portion of the curved display, and has a concave shape receding from the front toward the rear of the curved display. The curved monitor 110 may be embodied by a display device such as LCD, FED, PDP and OLED.

A three-dimensional virtual space with the x-axis, y-axis and z-axis is output through the curved monitor 110.

The backlight unit 130 is disposed behind the curved monitor 110 and serves to emit light toward the curved monitor 110.

The three-dimensional filter unit 150 has the same radius of curvature as the curved monitor 110 and is disposed in front of the curved monitor 110.

The three-dimensional filter unit 150 may be in close contact with the front surface of the curved monitor 110 or disposed apart from the front surface of the curved monitor 110.

The three-dimensional filter unit 150 may be embodied by a lenticular lens sheet.

The lenticular lens sheet is formed from arrangement of a plurality of semi-cylindrical lenses, and has one surface which is embossed (relatively small wave-like) and the other surface which is treated to be flat and smooth. Since the structure of the lenticular lens sheet is well known in the art, detailed explanation thereof will be omitted.

A three-dimensional image is realized in such a manner that a left-eye image displayed on the curved monitor 110 is presented to a user's left eye through the left portion of the lenticular lens sheet and a right-eye image displayed on the curved monitor 110 is presented to a user's right eye through the right portion of the lenticular lens sheet. Further, since the lenticular lens sheet is concavely formed with the same curvature as the curved monitor 110, an optical illusion is generated as if an image is located in the air, that is, the concave space.

Accordingly, such an optical illusion as if an image is located in the air may maximize a user's feeling of space by enabling a user to touch the image by putting his or her hand into the concave space.

The position input unit 300, as shown in FIG. 2, is disposed in front of the curved display 100, and may be secured to an upper end or a lower end of the curved monitor 110. The position input unit 300 serves to detect a three-dimensional position according to a user's non-touch motion in a predetermined sensing region.

The position input unit 300 includes a motion sensor unit 350, such as an infrared sensor, an ultrasonic sensor, or the like, which outputs a sensing signal upward from below or downward from above.

The motion sensor unit 350 may include one or more signal generators and two or more receivers.

The signal generator generates a sensing signal and transmits the sensing signal to the sensing region. The receivers receive the sensing signal reflected according to user's hand motion in the sensing region, amplify and demodulate the sensing signal, and transmit the sensing signal to the image control unit 500.

The sensing region S is a region in which a user inputs an input signal through air touch. If a user moves his or her hand in the sensing region S, a three-dimensional position is detected through the position input unit 300.

Although, in the present invention, a user's hand 100 is used as a three-dimensional object for inputting an input signal by air touch in the sensing region S, any other object with which a user can perform air touch may be used.

Such a sensing region S, as shown in FIG. 3, includes a range extending forward from the concave surface of the curved monitor 110 by a predetermined radius of curvature r, a range extending in a longitudinal direction l of the curved monitor, and a range extending in a height direction h of the curved monitor.

Further, the sensing region S may further extend in each direction by a predetermined value α, and thus may have a sensing range defined by r+α, l+α and h+α.

The image control unit 500 determines the position of a signal input by user's air touch by calculating and processing the sensing signal transmitted from the position input unit 300, and transmits an output signal including three-dimensional position information with respect to the input signal to the curved monitor 110, thereby controlling a three-dimensional image displayed on the curved monitor 110 according to the signal input by air touch.

The operation of the curved display apparatus constituted as above is as follows.

In a state in which a three-dimensional image is displayed on the curved monitor 110 and a virtual image P is displayed in the concave space through the three-dimensional filter unit 150 as shown in FIG. 4, a user can perform air touch by moving his or her hand in the sensing region S.

If a user moves his or her hand in the sensing region S for air touch with the virtual image P displayed in the concave space through the three-dimensional filter unit 150, the position input unit 300 senses the position and movement in all directions of the user's hand and transmits the corresponding three-dimensional position information to the image control unit 500.

Subsequently, the image control unit 500 applies control information to the image displayed on the curved monitor 110.

Especially, since a user can position his or her hand in the concave region defined by extending in the direction r from the front surface of the curved monitor 110, a user's feeling of space is increased.

For example, as shown in FIG. 4, if a globe is displayed as the virtual image P and a user wants to rotate the globe by air touch, a user can stretch his or her hand to the opposite side of the globe positioned in the concave region, which increases feeling of space.

As shown in FIG. 5, the curved display 100 may further include an interaction unit H configured to be synchronized with the position information sensed through the position input unit 300 and perform physical interaction corresponding thereto, thereby increasing realistic effects when a user takes a motion of moving the image.

The interaction unit H may be embodied by a thin element in consideration of the thickness of the curved display 100, and may include a polymer-based haptic element or piezo element.

For example, if the interaction unit H includes a haptic element configured to blow air and a user performs air touch for rotation, zoom-in and zoom-out of the globe which is a virtual image P displayed through the curved monitor 110 and the three-dimensional filter unit 150, the interaction unit H blows air in the rotating direction, zoom-in direction and zoom-out direction, thereby achieving four-dimensional effects, that is, providing realistic effects for a user.

Besides the haptic element for blowing air, the interaction unit H may further include devices capable of providing various haptic effects, such as sense of touch, sense of pressure, sense of humidity, sense of adhesion, thermal sense, sense of vibration, or the like.

Although the present invention has been described with reference to the preferred embodiments, it will be apparent to those skilled in the art that various improvements, modifications, replacements, and additions can be made without departing from the scope and spirit of the invention.

INDUSTRIAL APPLICABILITY

The curved display apparatus providing an air touch input function according to the present invention can maximize a user's feeling of space by enabling a user to stretch his or her hand into the concave space and perform air touch with a realistic three-dimensional image displayed through the three-dimensional filter unit and the curved monitor, thereby enhancing three-dimensional image effects in three-dimensional games, three-dimensional space simulations, etc.

The invention claimed is:

1. A curved display apparatus providing an air touch input function comprising:
   a curved display including a concavely curved monitor to display a three-dimensional image, wherein a top and a bottom of the curved display are bent to include the concavely curved monitor;
   a backlight unit being disposed behind the concavely curved monitor and configured to emit light toward the concavely curved monitor;
   a three-dimensional filter unit being disposed in front of the concavely curved monitor and aligned along the concavely curved monitor and configured to display a virtual image, wherein a radius of curvature defined by the three-dimensional filter unit is identical to a radius of curvature defined by the concavely curved monitor,
   wherein a concave region is formed and defined by the front of the concavely curved monitor, the virtual image being displayed in the concave region,
   wherein a length of the three-dimensional filter unit is substantially identical to a length of the concavely curved monitor;
   a flat-shaped position input unit having a motion sensor unit, the flat-shaped position input unit disposed at one non-curved end of the three-dimensional filter unit and configured to detect a three-dimensional position according to a user's non-touch motion in the concave region, wherein the motion sensor unit has one or more signal generators configured to generate and transmit a sensing signal to the concave region and two or more receivers configured to sense the sensing signal reflected in the concave region, the one or more signal generators and the two or more receivers being disposed together in a row,
   wherein the one or more signal generators are configured to generate and transmit the sensing signal to a sensing region, and the two or more receivers are configured to receive the sensing signal reflected according to the user's non-touch motion in the sensing region,
   wherein the sensing region includes a range extending forward from a concave surface of the concavely curved monitor by a predetermined radius of curvature, a range extending in a longitudinal direction of the concavely curved monitor, and a range extending in a height direction of the concavely curved monitor; and
   an image control unit configured to control the three-dimensional image displayed on the concavely curved monitor and configured to control the virtual image displayed in the concave region by transmitting position information sensed through the flat-shaped position input unit to the curved display,
   wherein an air touch of the virtual image through the user's non-touch motion is performed in the concave region,
   wherein an opposite side of the virtual image positioned in the concave region is touchable as the virtual image is displayed in the concave region,
   wherein the flat-shaped position input unit is configured to sense a position and a movement in all directions of the user's non-touch motion of the virtual image in the concave region and the image control unit is configured to control the virtual image in response to the flat-shaped position input unit without mapping between the concave region and the virtual image,
   wherein the curved display further includes an interaction unit configured to blow air in response to the air touch of the virtual image, the interaction unit including a polymer-based haptic element or piezo element.

2. The curved display apparatus providing the air touch input function according to claim 1, wherein the motion sensor unit is an infrared sensor or an ultrasonic sensor configured to output the sensing signal upward towards the concavely curved monitor or downwards towards the concavely curved monitor.

3. The curved display apparatus providing the air touch input function according to claim 1, wherein the interaction unit is configured to be synchronized with the position information sensed through the flat-shaped position input unit and perform physical interaction.

4. The curved display apparatus providing the air touch input function according to claim 1, wherein the three-dimensional filter unit includes a lenticular lens sheet.

* * * * *